United States Patent
Faulkner et al.

(10) Patent No.: US 7,609,293 B2
(45) Date of Patent: Oct. 27, 2009

(54) IMAGE STABILISATION SYSTEM AND METHOD

(75) Inventors: David Andrew Alexander Faulkner, Malvern (GB); Gary Shaun Price, Malvern (GB); Philip John Kent, Malvern (GB); Paul Fretwell, Malvern (GB)

(73) Assignee: Qinetiq Limited (GB)

( * ) Notice: Subject to any disclaimer, the term of this patent is extended or adjusted under 35 U.S.C. 154(b) by 587 days.

(21) Appl. No.: 10/536,952

(22) PCT Filed: Dec. 4, 2003

(86) PCT No.: PCT/GB03/05287

§ 371 (c)(1),
(2), (4) Date: May 31, 2005

(87) PCT Pub. No.: WO2004/056089

PCT Pub. Date: Jul. 1, 2004

(65) Prior Publication Data

US 2006/0061658 A1    Mar. 23, 2006

(30) Foreign Application Priority Data

Dec. 13, 2002    (GB)    ................ 0229096.3

(51) Int. Cl.
*H04N 5/228* (2006.01)
(52) U.S. Cl. .................................. 348/208.6
(58) Field of Classification Search ............ 348/208.99, 348/208.4, 208.3, 208.6
See application file for complete search history.

(56) References Cited

U.S. PATENT DOCUMENTS 4,992,870 A * 2/1991 Samad ........................ 348/441
5,237,405 A * 8/1993 Egusa et al. ............. 348/208.1
(Continued)

FOREIGN PATENT DOCUMENTS

EP    0 560 610    9/1993
(Continued)

OTHER PUBLICATIONS

Tucker et al., Image Stabilization for a Camera on a Moving Platform, Proceedings of IEEE Pacific Rim Conference on Communications, Computers and Signal Processing, vol. 2, pp. 734-737, May 1993.*

*Primary Examiner*—John M Villecco
(74) *Attorney, Agent, or Firm*—McDonnell Boehnen Hulbert & Berghoff LLP

(57) ABSTRACT

A system for stabilizing video signals generated by a video camera which may be mounted in an unstable manner includes a digital processing means for manipulation of each incoming image that attempts to overlay features of the current image onto similar features of a previous image. A mask is used that prevents parts of the image that are likely to cause errors in the overlaying process from being used in the calculation of the required movement to be applied to the image. The mask may include areas where small movements of the image have been detected, and many also include areas where image anomalies including excess noise have been detected. The invention also discloses means for dealing with wanted movements of the camera, such as pan or zoom, and also discloses means for dealing with the edges of video signals as processed by the system. A method is also disclosed.

20 Claims, 11 Drawing Sheets

U.S. PATENT DOCUMENTS

| | | | |
|---|---|---|---|
| 5,510,834 A * | 4/1996 | Weiss et al. | 348/97 |
| 5,784,115 A * | 7/1998 | Bozdagi | 348/452 |
| 6,049,354 A * | 4/2000 | Sekine et al. | 348/208.6 |
| 6,459,822 B1 | 10/2002 | Hathaway et al. | |
| 6,628,715 B1 * | 9/2003 | Iu et al. | 375/240.16 |
| 7,167,199 B2 * | 1/2007 | Soupliotis et al. | 348/208.6 |
| 7,221,390 B1 * | 5/2007 | Kutka | 348/208.4 |
| 2002/0113901 A1 * | 8/2002 | Osberger | 348/699 |

FOREIGN PATENT DOCUMENTS

| | | |
|---|---|---|
| EP | 560610 A2 * | 9/1993 |
| EP | 1 117 251 | 7/2001 |
| EP | 1117251 A1 * | 7/2001 |
| GB | 2 271 241 | 4/1994 |
| JP | 2116810 | 5/1990 |

* cited by examiner

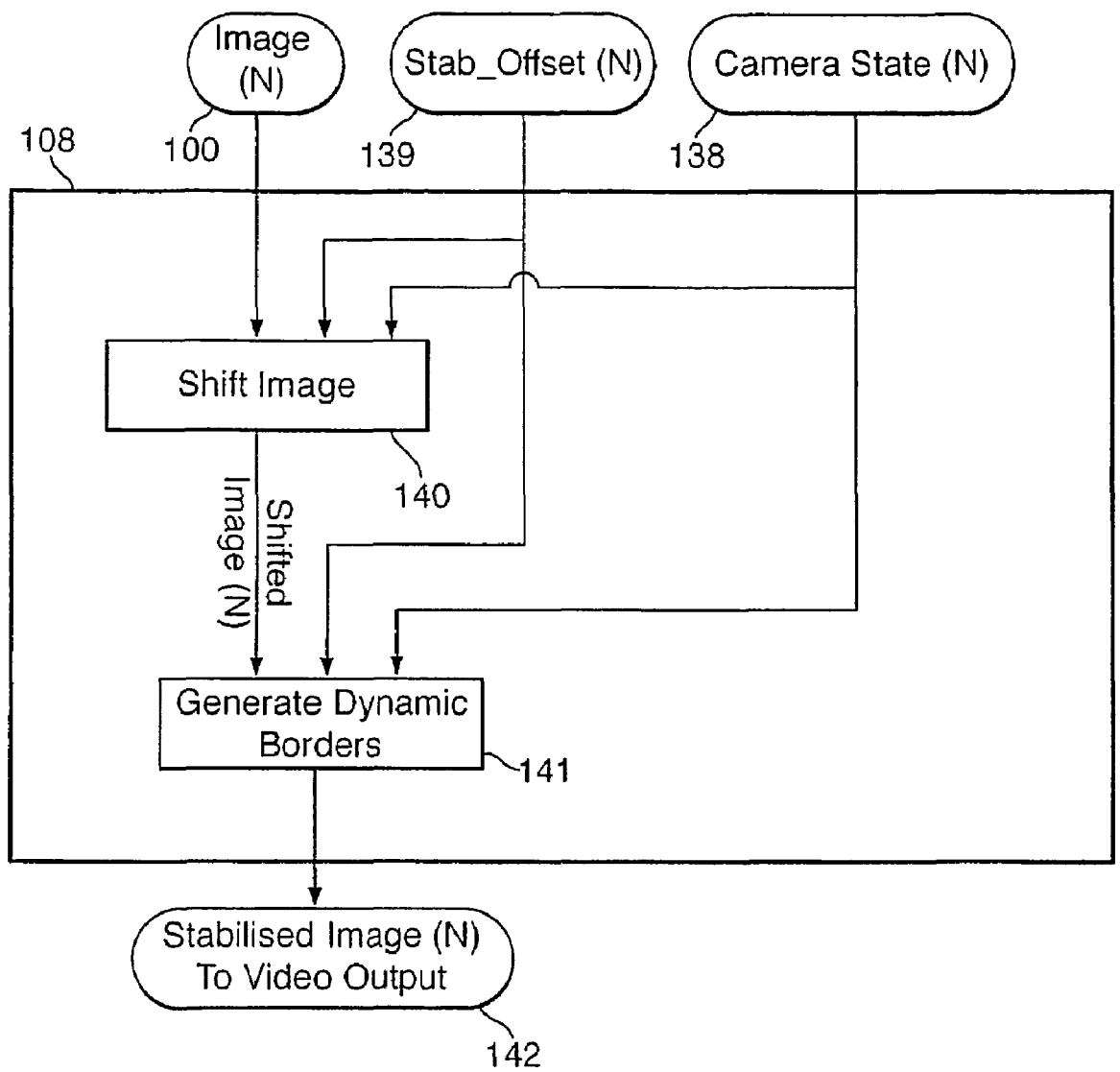

IMAGE STABILISATION SYSTEM AND METHOD

This invention relates to a system and method for the stabilisation of video images produced by a camera. In particular, it relates to means for reducing or eliminating the offset of successive images recorded by the camera caused by undesired camera motion such as wobble.

Undesired camera motion can distort the received image, or make visual analysis of the image hard, due to the perceived jumpiness on the reproduction apparatus. Such camera motion can be caused, for example, by wind blowing on a camera support pole, or unstable support due to the camera being hand held, or mounted on a moving vehicle or boat etc.

One method used to stabilise the video image from a camera suffering unwanted movement is to use a motorised camera mount that measures camera movement caused by such things as wind buffet, and physically moves the camera in response. Gyroscopes may be used to detect the movement of the camera, and electric motors used to correct for it. This provides, in effect, an electromechanical negative feedback loop that attempts to keep the camera in a fixed position. This solution can be very effective where the camera is used in surveillance applications where the camera is mounted on a permanent or semi-permanent mount. The method is able to reduce blurring of the video image even when very slow camera shutter speeds are used as, in a correctly stabilised system, the camera itself is not moving. It is also unaffected by the lighting conditions of the scene, as no reference is made to the recorded video signal, but the technique can be costly, cumbersome and may require significant electrical resources, especially if the camera system is large.

A development of this is to use sensors to detect the camera motion as before, but use the signals from the sensors to process the signals produced by the camera. The processing may involve electronically shifting the image with the intention of bringing it into alignment with previous images recorded by the camera. This approach eliminates the requirement for a motorised camera mount, but the movement sensors are still required.

Image stabilisation can be done purely by electronic processing of the image signal. These methods consist of comparing a current image produced by the camera with a reference image, and spatially moving the current image so as to bring it into line with the reference image. Different techniques are employed to do this.

One such technique, GB0012349.7 describes a method for stabilising the video images of a camera. This approach uses a global motion estimation in which explicit horizontal and vertical components are used as a measure of how much a current image needs to be shifted to provide a best match against a reference image. These components are high-pass filtered before being input to the processing, so allowing slow camera movements to go through to the output video signal, whereas sudden movements are input to the stabilisation processing. This system is susceptible to errors if something in the scene at which the camera is pointing is moving, and it has no facility for coping with deliberate panning or zooming of the camera.

According to the present invention there is provided a video image stabilisation system that is arranged to receive one or more signals representative of a plurality of images wherein, for an image n following at least an image (n−1) and an image (n−2) the system is arranged to estimate a Global Motion Offset (GMO) value between image n and a previous image representative of the spatial separation between the image n and the previous image, and apply a corrective movement to the image n based upon this GMO, characterised in that:

the system is arranged to estimate the GMO for the image n with reference to a mask that represents a region or regions of the image n that are not to be considered in the GMO estimation, the region(s) being region(s) estimated as likely to mislead the calculation of the GMO.

The present invention is able to reduce the effect of unwanted camera movements under some circumstances. It provides a system for the reduction of the effects of camera movement on the resultant video image. The system uses previous images in the video sequence as a reference when calculating the movement of the current image.

The GMO is a measure or estimation of the distance of the current image n from the reference image r. This distance is typically a vector comprising the number of pixels that n is from r, in both the horizontal and vertical planes; i.e. it indicates the shift that should be applied to n so as to get a best match between n and r, and is calculated by any suitable means. Note that different means for calculating this best match may produce different results, not all of them being the optimum value. Calculating the optimum value may be too time consuming, or require too much computer resource, and so other techniques may be employed that give an approximate value for the offset. The reference image r is preferably the previous image in the video sequence, i.e. image (n−1) as this is likely to be closest, in terms of having the lowest GMO, to the current image. Images other than the previous image may be used as r however, such as (n−2) or (n−5), but depending on the level and frequency of vibration these are likely to have larger GMOs.

Further information is used in estimating the GMO to get improved performance. A mask is one such piece of information. This is a binary image that is used to exclude pixels in the image n that may adversely affect the GMO calculation. The mask is preferably generated by examining the image n for objects moving within sub-regions of the image, and then setting the corresponding bits of the mask to exclude these areas. This is preferably done by dividing the image n into a plurality of sub-images $n_s$, and calculating a Local Motion Offset (LMO) for each sub-image $n_s$. The LMO may be calculated in the same general manner as the GMO, but different techniques may be more suitable due to the fact that each sub-image $n_s$ is smaller than the image n. The LMO may be calculated using a corresponding sub image taken from the same reference image r as used with the GMO, but preferably the corresponding sub-image taken from image (n−2) is used. Again, other reference images may be used.

The mask is preferably augmented to correspond to areas of the image n which are represented by pixels that do not behave with a desired characteristic. These pixels may be "dead" pixels, which appear to be always on or always off, or could be pixels that behave in an irregular manner to the incoming light. They may also be pixels that are deemed to be corrupted by noise above some threshold. The detection of noise may be done in any suitable manner. Such areas are known herein as anomalous areas, and the pixels making up the areas as anomalous pixels.

The images used to calculate the GMOs and LMOs are preferably sub-sampled before the calculation takes place. This has benefits in that the calculation effort is reduced, and the low-pass filtering inherent in the sub-sampling process makes the stabilisation system more resilient to image noise. Local minima in the calculations are also less likely to be a problem. For improved accuracy, the GMO or LMO calculations may be iterated at multiple resolutions, starting at a lower resolution, generating a GMO/LMO from this, and then moving to a higher resolution taking account of the GMO/LMO calculated in the previous iteration. Multiple iterations at a given resolution may also be done before moving to a higher resolution.

The GMOs and LMOs calculated for the input images may advantageously be used to estimate whether a pan or zoom operation has been applied to the camera. Here, pan is taken to mean movement of the camera such that it points in a different direction, either horizontally or vertically, or both, and zoom is taken to mean that the focal length of the camera lens is changed such that a different field of view is seen by the camera.

Usefully, a prediction of motion offset errors can be made using the LMOs and GMOs. One such error is "lock-on". This may occur when, for example, the substantially the whole scene visible by a camera is taken up with a moving object. For example, if the camera were pointing at a road scene, and a very large lorry were to pass close to the camera, then much of the image recorded by the camera may be taken up by the lorry. Without any error correction, this would give the impression of a sudden pan taking place, which would cause the stabilisation routine to erroneously try to track the movement.

Another such error relates to "static camera detection". Analysis of the GMO history is used to predict when the camera is not moving. If this state is detected, then the GMO vector is set to zero. Without this, the accumulation of errors in small GMOs can lead to erroneous stabilisation to occur.

The GMO vector is preferably translated into a final stabilisation offset (SO), which represents the vector to be applied to the current image after calculation and processing of the GMO vector has been carried out. This translation preferably takes into account the motion offset errors and estimates of pan and zoom operations. The translation preferably involves a decay factor that tends to reduce the influence of SOs applied to previous images. This is useful, as respective SO vectors tend to accumulate, such that an offset applied to an image may otherwise remain even if the requirement for such an offset has ended.

A video signal that has been processed according to the current invention may result in the edges of the video image not being aligned with the edge of the display area of a display device such as a television screen. This is as a result of the image being shifted relative to the display device according to any detected motion offsets. Preferably, such edges, which may be rapidly changing in position, are kept hidden from view by means of the addition of a border area between the image edge and the display area of a display device. More preferably, the border is adapted to change size according to the displacement of the images relative to the display area. This may take into account the displacement of prior images as well as the one currently being displayed.

Alternatively, any blank areas around the image to be displayed caused by shifting of the image may be augmented with image information from prior images. In this way, a full image having no artificial borders can be presented to the display device.

As a further alternative, the image to be displayed may be expanded in size such that any blank areas are filled. This may be done by scaling the image using known algorithms.

Note that the video signal or signals input to the system may come directly from a camera, or they may come from some other means such as a video recorder or digital image storage on a computer system, or a mixture of such sources.

The present invention may be implemented on a computer system, including those incorporating a general purpose microprocessor, and those incorporating a Digital Signal Processor device. A computer can be programmed to so as to implement an image stabilisation system according to the current invention.

The invention will now be described in more detail, by way of example only, with reference to the following Figures, of which:

FIG. 1 diagrammatically illustrates the hardware upon which the current invention may be implemented;

Figure 9:
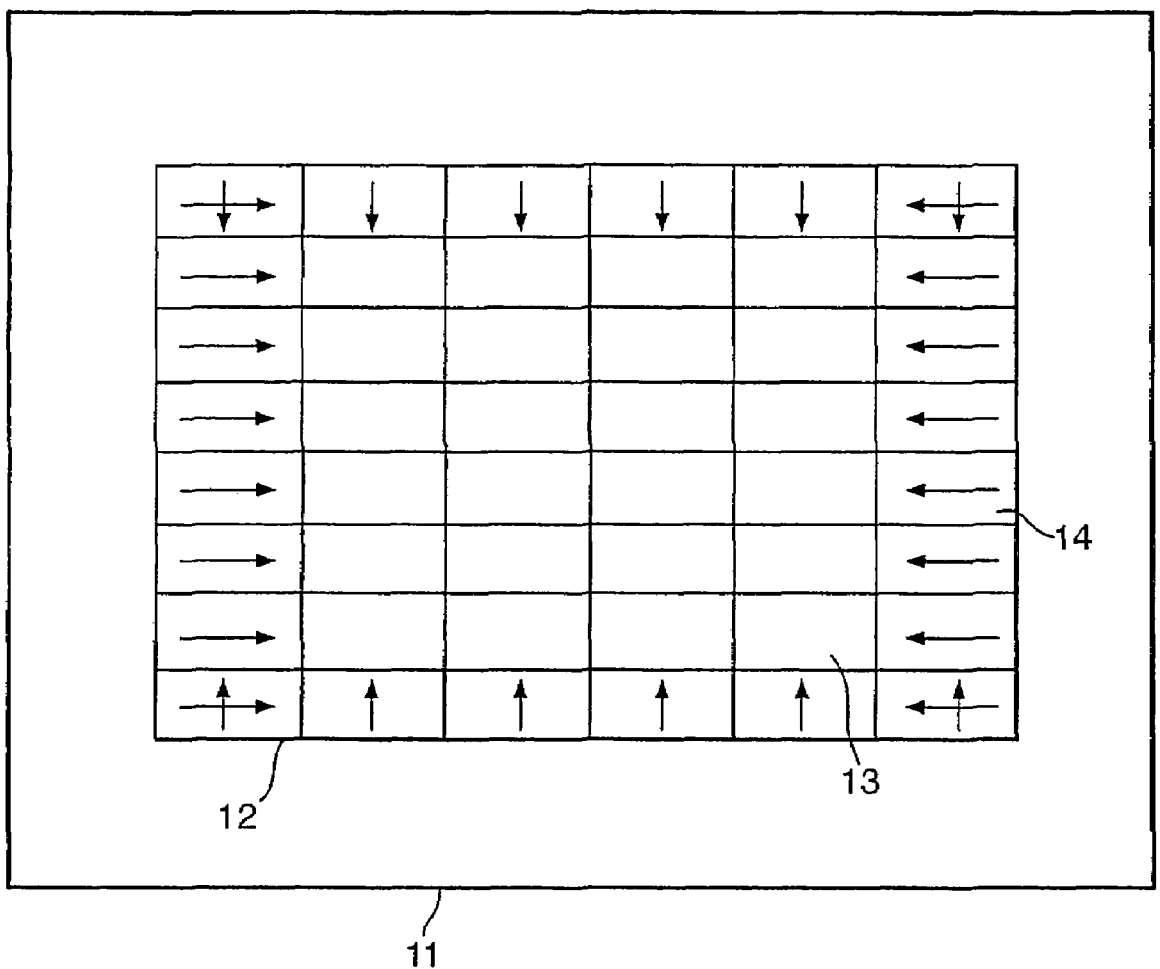

FIG. 9 diagrammatically illustrates the use of the outer set of LMOs for an image n in the detection of a zoom operation;

FIG. 10 shows in more details the steps involved in generating a final stabilised image given the previously calculated information; and FIG. 11 shows the effect of the dynamic border generation on the stabilised image.

Figure 1:
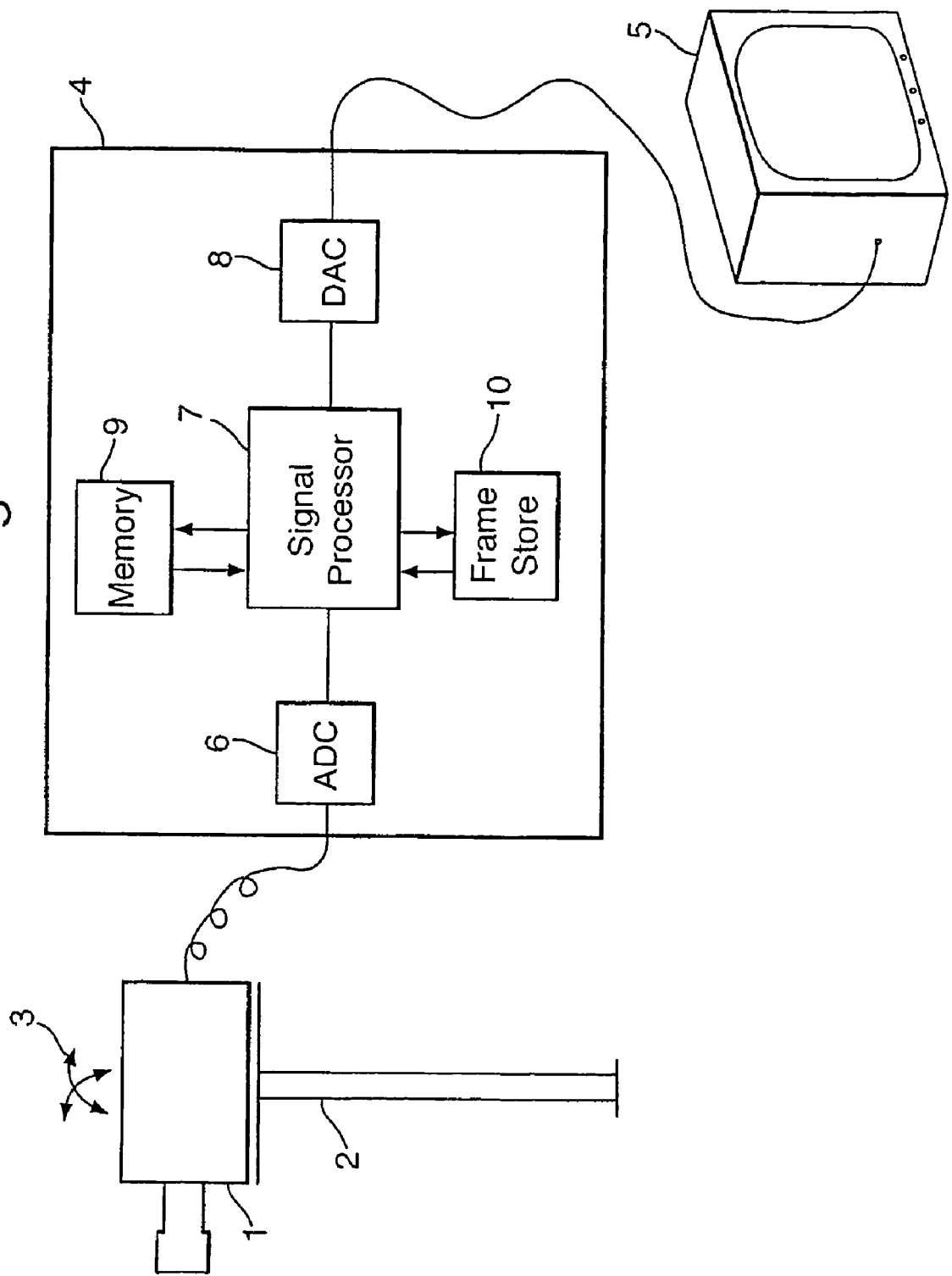

FIG. 1 illustrates a typical hardware arrangement that can be used to implement the current invention. In this example the video signal is generated by a video camera 1 mounted upon a mount 2. The camera is subject to buffeting by the wind, which, if sufficiently strong, will cause the camera to wobble on the mount, as illustrated by the arrows 3. The camera supplies a video signal to the stabilisation system 4, the output of which is a video signal that has been processed as described herein, which may then be displayed on a suitable display 5 or recorded on some suitable medium. The invention may be applied to many different video signal formats, both digital and, with suitable digitisation, analogue; the current embodiment is set up for processing PAL and NTSC signals.

The stabilisation system 4 carries out the processing of the signal to attempt to reduce any instability of the camera image. The system 4 contains an analogue to digital converter (ADC) 6 that digitises the incoming analogue video signal. The digital signal is then fed to a signal processor 7. This processor 7 is able to perform complex calculations and manipulations upon the incoming data stream and provide an output signal that may be converted to an analogue signal by the digital to analogue converter 8 ready for replay on the display unit 5. The processor 7 is connected to a digital framestore 10 that is able to store the current image n from the camera, as well as the previous two images (n−1), (n−2). These are used in the processing. The processor 7 is also connected to a general digital memory 9. This memory 9 holds the program that implements the current invention, as well as being used as a general storage area for data generated in connection with the operation of the invention.

The ADC 6 digitises the incoming signal at a resolution of 720×288 (for PAL) or 720×240 (for NTSC), although only the central portion of this is used as an input to the processing algorithm, as the outer parts of the image may represent parts of the scene that are not present in two successive images due to the camera movement. Also, certain camera types contain inactive pixels at the borders of the image area. The active area used in the current embodiment has a resolution of 576×256 (for PAL) or 576×224 (for NTSC). Of course, the results of the processing are applied to the whole of the digitised image.

Figure 2:
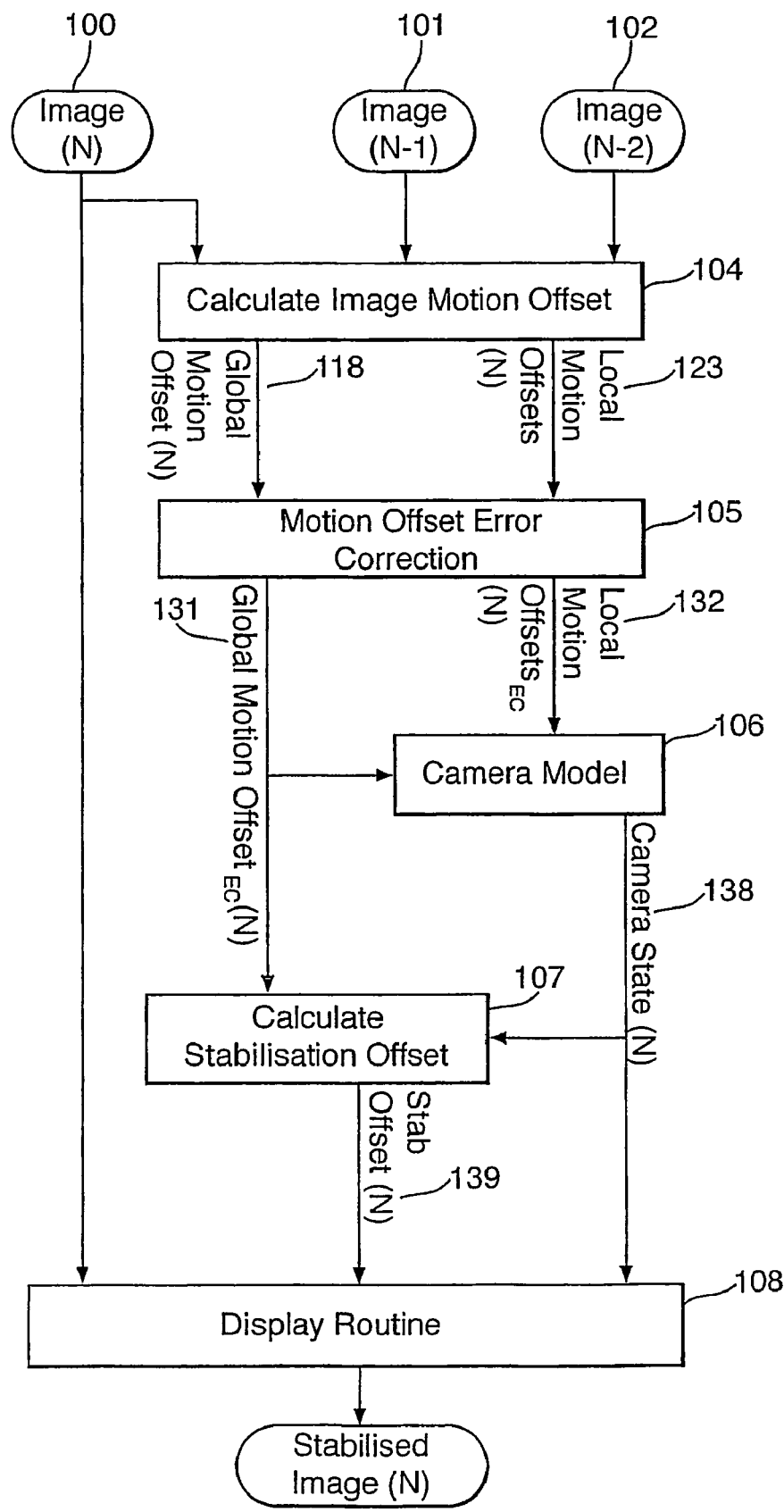
FIG. 2 is a data-flow diagram that shows the top level operation of an embodiment of the current invention.

FIG. 2 shows a top level data-flow diagram of the operation of one embodiment of the current invention. This assumes that at least two images have been previously captured, and that the current image n has been placed in the framestore 10. This is going to be the case for all occasions apart from the time when the system is first switched on.

The processing relating to image n is as follows. Images n 100, (n−1) 101 and (n−2) 102 are presented to module 104 which calculates the GMO and LMOs for image n, as well as a mask image. Details of how these offsets and mask are calculated are provided later. The image is divided up into 6×8 (for PAL inputs) or 6×7 (for NTSC) regions for calculation of the LMOs, although of course a different number of regions may be used. Note that the mask may be referred to herein as a Local Motion Mask (LMM), as its primary task is to mask out areas of the image where local movement has been detected. The mask may, however, be set to include anomalous areas or pixels. The mask may also be a composite mask, derived from any local motion detected and anomalous areas, although it may still be referred to as an LMM.

Following calculation of the GMO, LMOs and the mask, this embodiment of the invention analyses these values and previous such values to check for motion offset errors. This is done in module 105, and produces "error corrected" offsets $GMO_{EC}(n)$ and $LMOs_{EC}(n)$. The data is used to detect for lock-on errors and static camera errors. The details of how this is done is described in relation to FIG. 7 below.

The current embodiment then examines $GMO_{EC}(n)$ and $LMOs_{EC}(n)$ as modified in module 105 to detect, and compensate for, desirable camera movements, namely pan and zoom. This detection produces a "camera state" value, which is then used to adjust how the calculated offset is applied to the image n. The detection is done in a camera model module 106. Details of how the pan and zoom states are detected are provided below, with reference to FIG. 8.

The state outputs of module 106 and the $GMO_{EC}(n)$ value calculated in module 105 are now used to calculate the final stabilisation offset to be applied to the image 71. This is done in module 107, which produces an output offset SO(n). This offset is passed to the display routine module 108, which shifts image n according to the value of SO(n), and sends the signal representative of this image to a display device or recording medium, after first applying any borders as described below.

Figure 3:
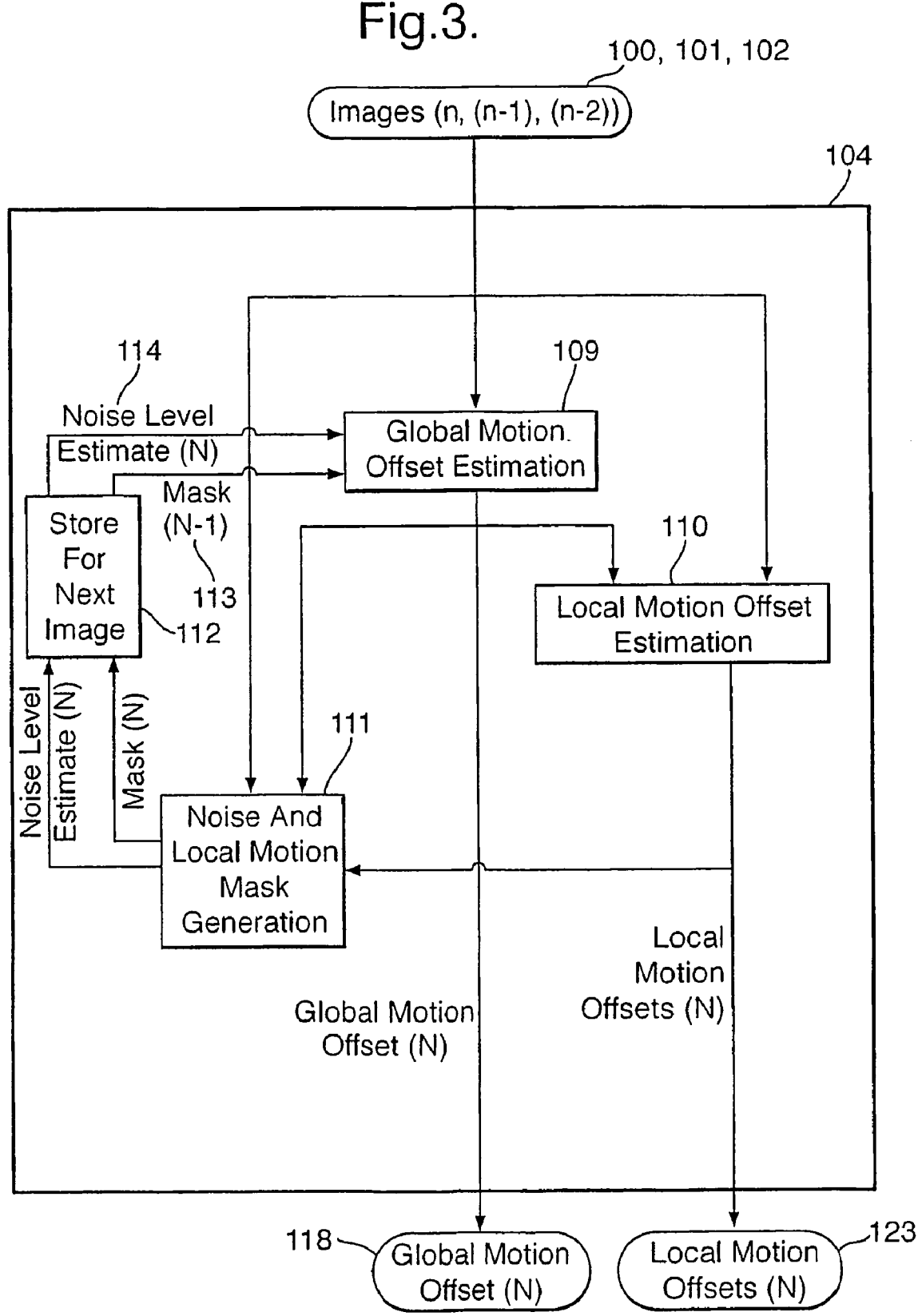
FIG. 3 shows in more detail the step of estimating the image motion offsets and Local Motion Masks.

FIG. 3 shows in more detail the process of generating the GMO, LMOs and LMM for each image n, as used in the current embodiment. Images n, (n−1) and (n−2) 100, 101, 102 are supplied to module 104. Images n and (n−1), and the LMM calculated using image(n−1) in the previous iteration are used to estimate a GMO in step 109, based upon a known algorithm described later in this specification, with reference to FIG. 4. Images (n) and (n−2) are also used to estimate the LMOs for image n, in step 110. For this, the image n is divided up into an array of 6×8 (for PAL) sub-images, or local images, and an LMO estimated for each one. The last-but-one image (n−2) is used in the comparison as the difference between this and the current image is likely to be greater than if the last image is used, leading to better detection of movement within the local sub-image—it has been found that local motion tends to be smaller than global motion. The algorithm used to calculate each LMO is quite similar to that used to calculate the GMO, and is described in more detail later, with reference to FIG. 5.

The LMOs generated for image n (represented as LMO(n)) are used, along with the GMO for image n (GMO(n)), to generate a mask. The mask is generated in module 111. This mask is used in the estimation of GMO(n+1) and has 1 bit of information for each of the pixels in image n. If this bit is a 0, then the corresponding pixel in the image (n+1) is not used in the calculation of GMO(n+1). If the bit is a 1 then the corresponding pixel in the image (n+1) is used in the calculation of GMO(n+1). The mask is stored in memory 112 until it is to be used. The mask is used to mask out those areas of the image where local motion—which would otherwise distort the calculated GMO value—has been detected, and is also used to mask out anomalous areas. An estimate 114 of the level of noise in the image is carried out, and stored 112. for later use More detail of the mask generation and noise estimation is provided later, with regard to FIG. 6.

Figure 4:
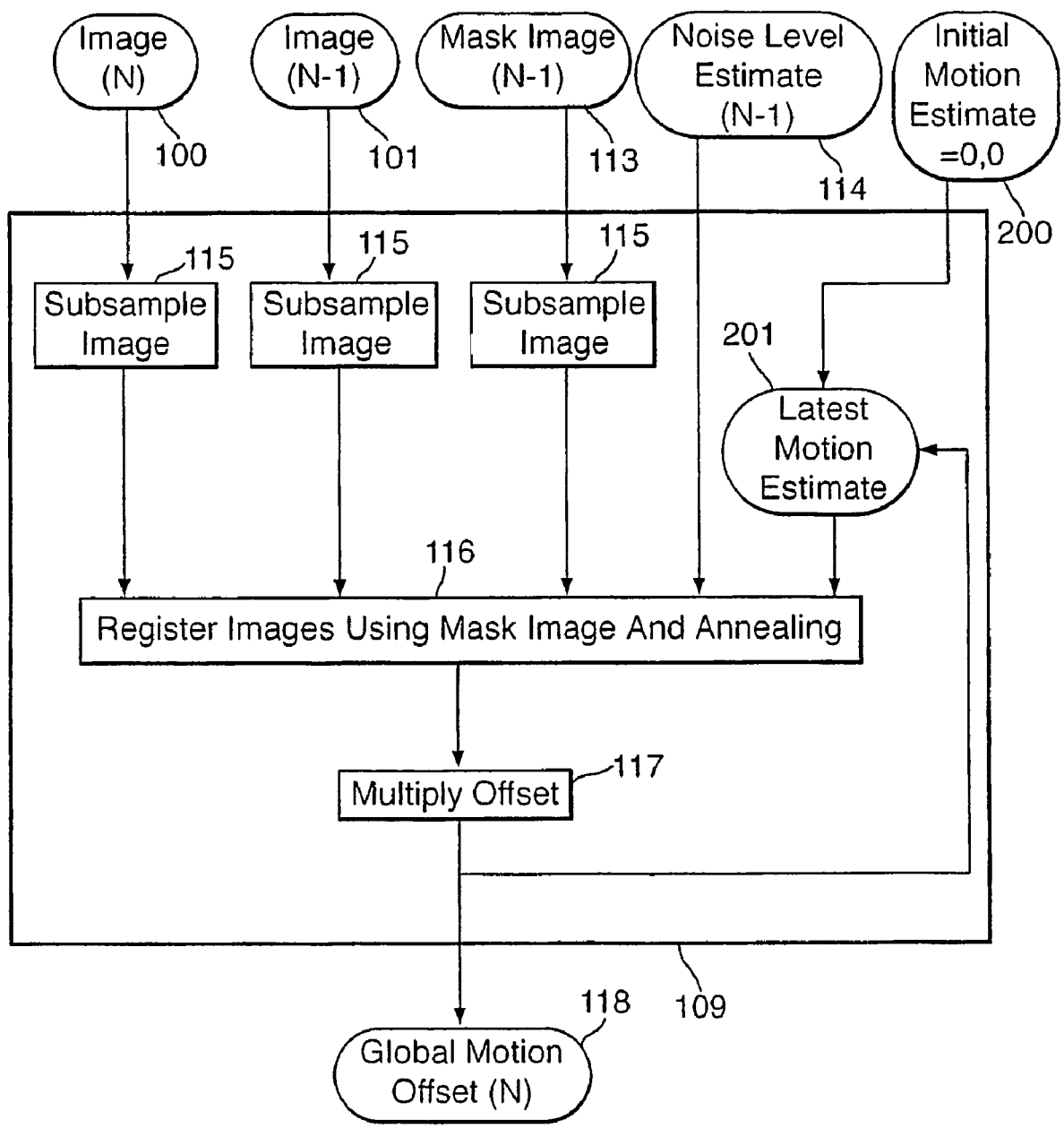
FIG. 4 shows in more detail the calculation of the GMO for each image n.

FIG. 4 shows in more detail the steps taken in module 109 in the generation of the GMOs. The inputs to this module are the current image n 100 and previous image (n−1) 101, the previously calculated LMM 113 and the noise level estimate 114. There are three main steps to the procedure:

In the first, the input images and the LMM are sub-sampled in modules 115 to reduce their size, and hence increase the speed and noise resilience of the operation;

The second does the main calculation of the GMO, in module 116, based on the sub-sampled image;

The third corrects the calculated GMO, in module 117, to take account of the sub-sampling.

The sub-sampling of the image is done using a bilinear interpolation process, which will be familiar to a person skilled in the relevant art, and will not be described further herein. More details of this can be found in Sonka, Hlavac and Boyle, "*Image Processing and Machine Vision*", $2^{nd}$ edition, 1998 (PWS) Brooks/Cole Publishing. The current embodiment sub-samples to reduce the resolution by a factor 4 in the vertical dimension and by a factor 8 in the horizontal dimension. This has been found to produce adequate results whilst giving a useful reduction in computation time. Other benefits of sub-sampling include a lower susceptibility to noise in the image, along with a reduced probability of the GMO calculation being confused by local minima, as the sub-sampling effectively low-pass filters the image.

The calculation of the GMO value involves calculating the translation that needs to be applied to image n so as to minimise the misregistration of the image n with image (n−1), as sub-sampled. A measure of this misregistration is found by summing the intensity differences pixel-by-pixel between the images n and (n−1) (here represented as $I_n$ and $I_{n-1}$ for clarity), to create an error value E.

The procedure attempts to minimise the square of this error value. Thus, $$E = \Sigma_{x,y} [I_n(x,y) - I_{n-1}((f(x,y), g(x,y))]^2 \qquad \text{(Eqn 1)}.$$

where $I_n(x,y)$ represents a point x,y within image n and f(x,y) and g(x,y) are transformations of the co-ordinates x and y (i.e. each pixel location) respectively that transform the image co-ordinates of image n into those of image (n−1). A Taylor expansion of Eqn 1 yields an equation that is conveniently analysed, and by means of differentiating this with respect to the parameters of the transformation functions f and g and setting these to zero, the resulting equation may be solved to reveal the latest update to the transformation, or GMO. Note that the invention pre-processes the images before doing the GMO calculation to provide a more accurate result. This pre-processing involves multiplying on a pixel-by-pixel basis the image (as sub-sampled) with the mask (as similarly sub-sampled), effectively reducing the active area of the image n which has the effect of improving the accuracy and simplifying the calculations.

The use of a Taylor series approximation of the error equation, Eqn 1 introduces approximation errors, as the current embodiment only uses the first order term. This can result in the process finding local minima of the error function, and hence providing an incorrect GMO. To reduce the effects of the approximation, the process of calculating the GMO described above is iterated. An initial motion estimate 200 of 0.0 is used, which is updated at each iteration. Each iteration uses an updated version of the current image n, warped, or shifted, by the latest estimate 201 of the transformation parameters (i.e the latest value of the current GMO being calculated)

In calculating the GMO the current embodiment also uses an annealing process to improve accuracy and help mitigate against errors caused by objects moving through the scene: The annealing process decides whether any given pixel is to be used in the current GMO calculation iteration. It does this by looking at the absolute difference between each pixel in the image (n−1) and the corresponding pixel in the image n that has been warped or shifted by the current value of the GMO being calculated. If this difference is greater than a threshold value then it is not used in the next iteration. The noise level estimate 114 is used in calculating the threshold value. This process excludes pixels that do not line up despite having been warped—the cause of this being most likely due to image anomalies or movement of objects through the scene. As the images become more aligned due to the iterations of the process, the threshold chosen is decreased, as more of the pixels in the images should line up resulting in a reduced absolute difference value. This process implements a form of robust statistical estimation. Other such robust statistical estimation methods are known and are applicable to the current invention.

The current embodiment calculates only the translation of the image n that provides an improved registration. Hence, for this case, $f(x,y)=x+\Delta x$ and $g(x,y)=y+\Delta y$. Rotational and scaling errors are not currently considered but the invention may equally be applied, with suitable adaptation, to stabilise a video signal derived from a source that may be susceptible to rotational or scaling instabilities. This adaptation involves representing the functions $f(x,y)$ and $g(x,y)$ in terms of translational, rotational and scale parameters thus:

$$f(x,y)=\Delta x+bx-cy \text{ and } g(x,y)=\Delta y+cx+by,$$

where the scaling factor=$(b^2+c^2)^{1/2}$ and the degree of rotation=$\tan^{-1}(c/b)$. These equations are then solved in a similar fashion to that described above. More information on this and other aspects of the calculation of the GMO may be found in Kent, P, "*Multiresolution Image Registration*" *IEE Colloquium on Multiresolution Modelling and Analysis in Image Processing and Computer Vision,* 1995, and in Kent, P, "*Multiresolution Image Registration and Mosaicing*" *Journal of Defence Science,* Vol. 1 No. 2, the contents of both of which are hereby included by reference. Note that these references detail a multiple resolution technique, whereby the GMO value calculated at a lower resolution is then applied to a subsequent GMO calculation performed upon an increased resolution version of the image. This can be repeated as necessary to get the required accuracy. The current embodiment has been found to give satisfactory results with a calculation performed at a single resolution, but may be adapted to use multiple resolutions if required. Other methods of calculating the GMO and LMOs exist and are applicable to the current invention.

Following the estimation of the GMO as calculated above, the value obtained is multiplied 117 by the same factors used in the sub-sampling to take account of the change in resolution of the image. Note that the current embodiment uses sub-sampled versions of the image it only for the calculation of the GMO and LMOs. All other operations work on the image in its original resolution.

Figure 5:
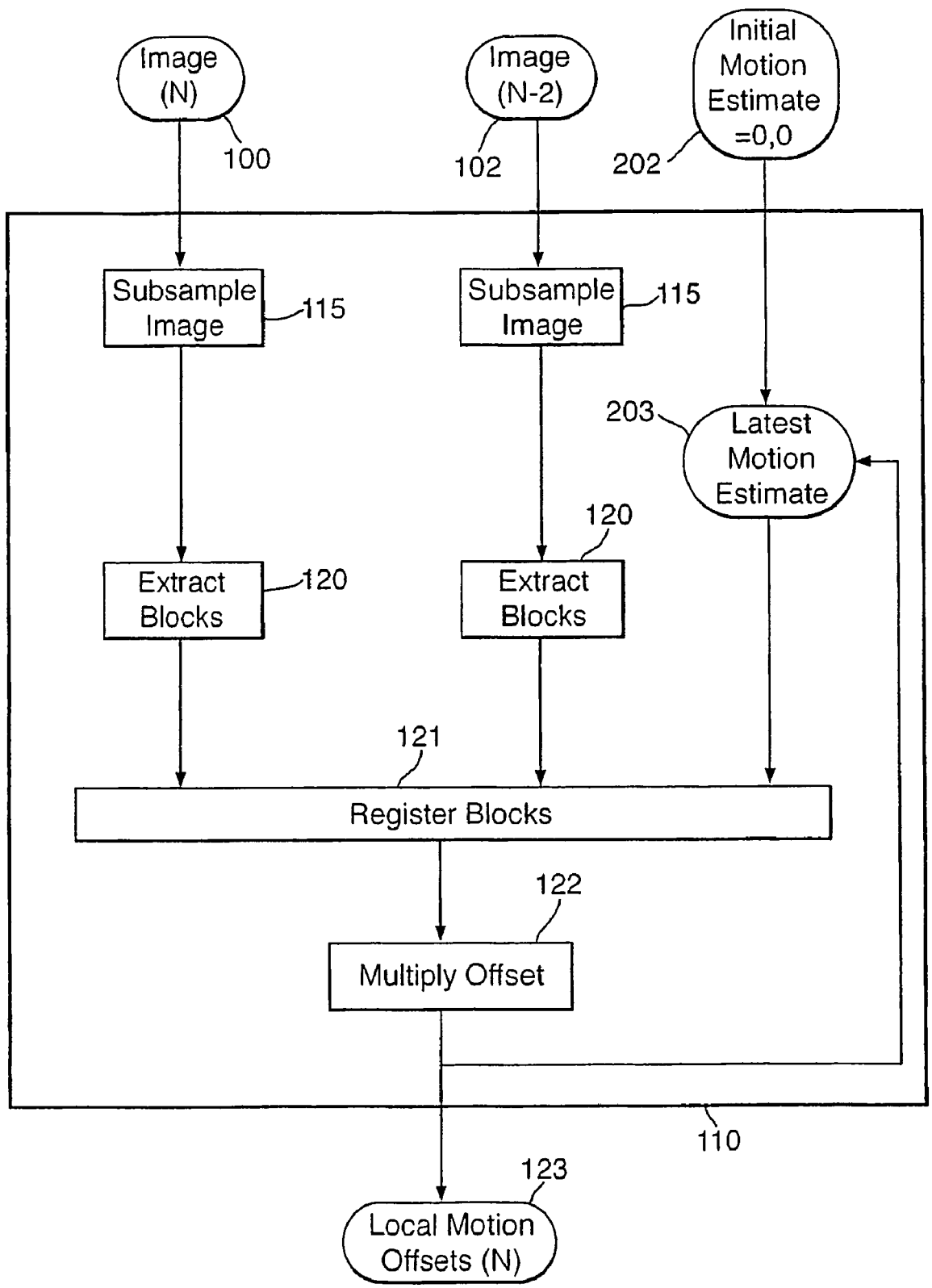
FIG. 5 shows in more detail the calculation of the LMOs for each image n.

FIG. 5 shows in more detail the process used to calculate the set of LMOs for each image n. The process is based on a simplified version of that used to calculate the GMO as described above. The image n is again sub-sampled as before to reduce the workload and image noise. After this, the sub-sampled image is divided up, in modules 120, into 6×8 sub-image blocks (for PAL), each of size 12×8 pixels. Each sub-image block is passed to a simplified version 121 of the GMO estimation routine, which lacks both the masking and annealing functions. The calculation is done iteratively as before, using an initial motion estimate 202, which is updated at each pass, as indicated by numeral 203. The masking and annealing functions are not needed due to the small size of each sub-image being processed. The vectors produced by module 121 are then multiplied up in module 122 by the same factor used in the sub-sampling to account for the reduced resolution of the images used in the processing. The current value of the GMO for image n, and for image (n−1) are then subtracted from the calculated LMOs values. This ensures that the LMO values are not corrupted by camera movements. The resulting LMOs 123 are vectors that hold the horizontal and vertical shift required to get a best match between the each sub-image of n and the corresponding sub-image of (n−2).

Figure 6:
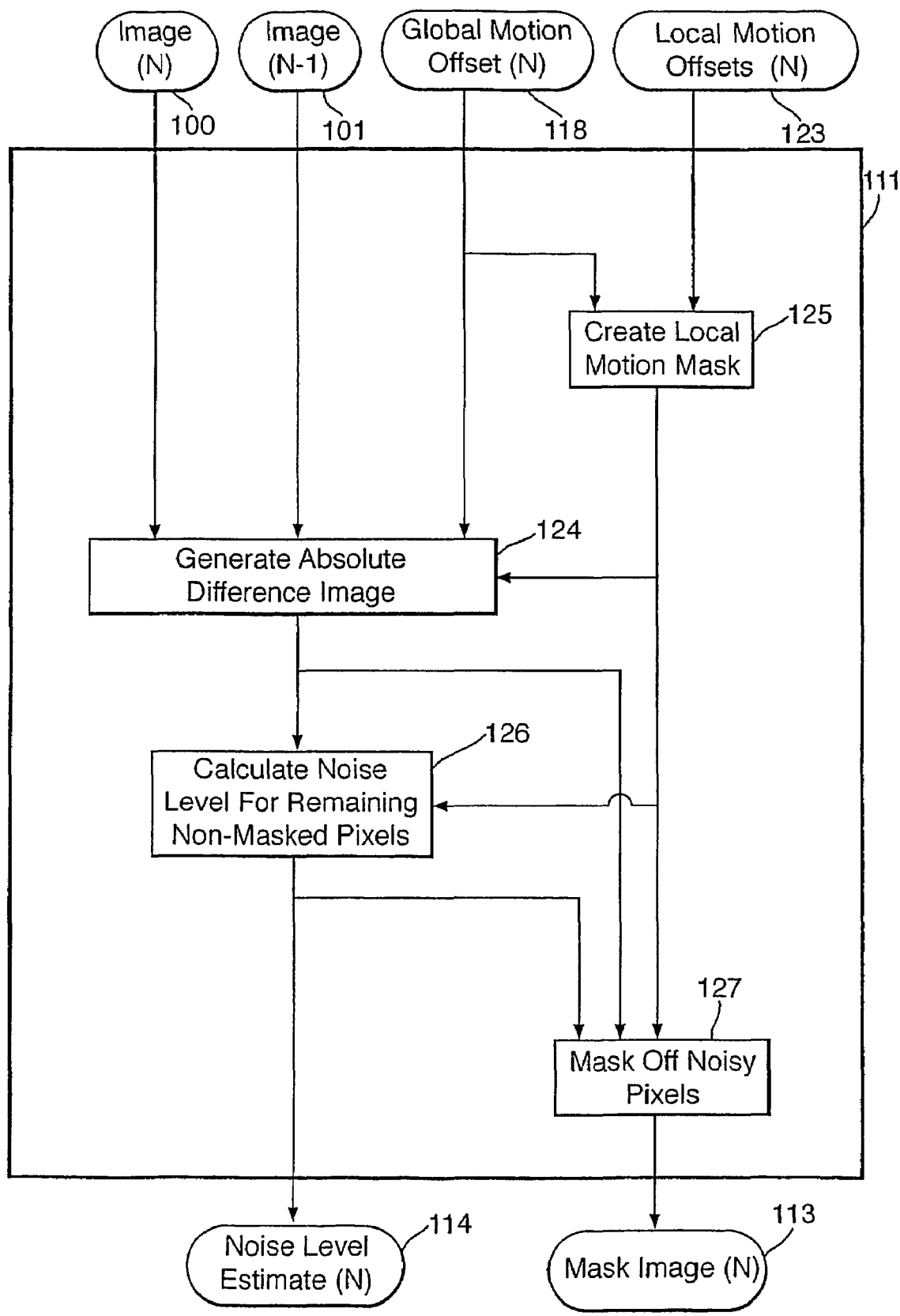
FIG. 6 shows in more detail the process of generating the mask image.

FIG. 6 shows in more detail the process of generating the mask. This mask is used as described above to remove from the relevant calculations pixels connected with both local motion effects and pixels behaving anomalously. If a sub-image has an LMO greater than a given threshold then the region corresponding to the whole sub-image is masked off by setting the appropriate mask bits to 0. This mask is the LMM, and is calculated in module 125. The LMM, in this embodiment, includes masking that corresponds to regions of the image n in which anomalous pixel behaviour has been detected.

The anomalous pixels are found in the following way. An image representing the absolute difference between image n, as shifted by the current GMO, and image I(n−1) is produced 124, i.e. $I_{\mathit{diff}}(n)=I(n)-(n-1)$. The parts of the LMM mask due just to motion effects as derived above is also used, such that $I_{\mathit{diff}}(n)$ only comprises those sub-images where significant local motion has not been detected.

The intensity levels of the resulting difference image are then examined in module 126. This is done by first generating a distribution of the pixel intensities of $I_{\mathit{diff}}(n)$. A threshold is then set, as the lowest decile of this range, multiplied by 5—this factor having been chosen empirically to give a reasonable degree of robustness to motion anomalies. All pixels above this intensity are then regarded as anomalous, and so the corresponding bits in the LMM are set to a zero, in module 127, to exclude them from the relevant operations, as shown in FIG. 3. This anomalous pixel threshold is used as the noise level estimate 114 used in the calculation of the GMO.

Figure 7:
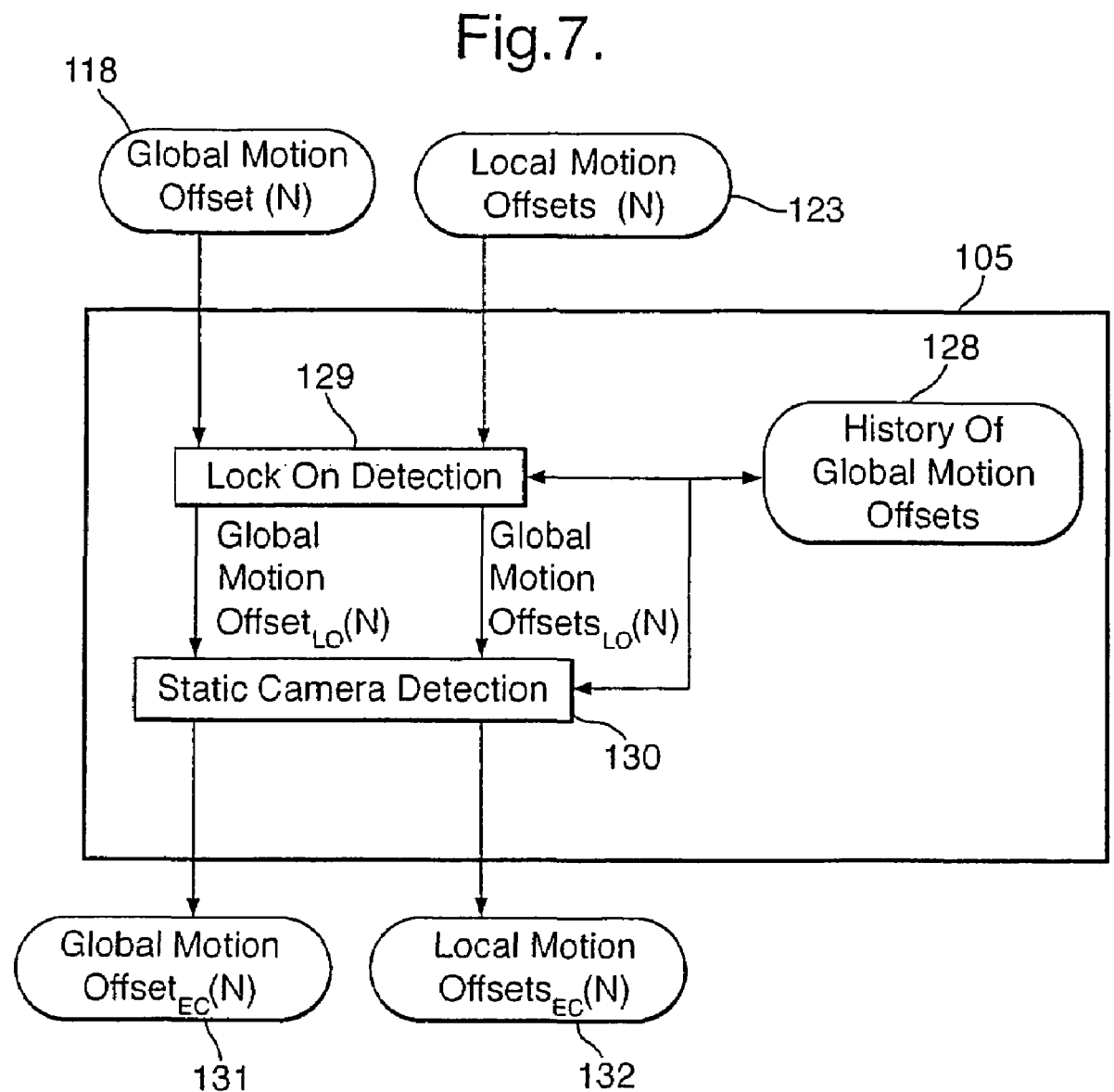
FIG. 7 shows in more detail the steps involved in correcting for motion offset errors in the GMO.

FIG. 7 shows a data-flow diagram of the motion offset error correction of module 105. For this purpose, module 105 has access to the GMO vectors from the current 118 and previous images 128 and the set of LMO vectors 123 from the current image that are stored in the system memory. Module 105 first does a lock-on estimation 129 to check for distortion of the GMO caused by very large moving objects. It does this using GMO(n), LMOs(n), and GMO(n−1) to GMO(n−25) (PAL), or to GMO(n−30) (NTSC), which have been stored in memory previously.

A lock-on is deemed to have occurred when:

i. GMO(n−1) to GMO(n−25) (or GMO(n−30) as appropriate) are all less than a given threshold value (5.0 pixels in distance is currently used);

ii. GMO(n) is greater than the given threshold; and iii. More than 50% of the LMOs(n) are greater than a given threshold (4.0 pixels in distance is currently used).

The current embodiment only looks at the horizontal component of the GMO and LMO vectors, although it is of course possible to use either or both components. When a lock-on is deemed to have occurred, the horizontal components of the GMO(n) and LMOs(n) are set to zero. This has the effect of stopping all stabilisation effects for this axis, for this particular image in the sequence. Stabilisation in the vertical axis can still occur however.

Module 105 also analyses the current GMO and the GMO recent history to estimate 130 whether the camera is actually stationary. It does this by looking at approximately one second's worth of the GMOs, equating to GMO(n) to GMO(n−49) (for PAL signals). If all examined GMOs are less than a threshold—usually set to 1 pixel for both the horizontal and vertical axes—then the camera is deemed to be static. In an alternative method, the variance of the examined GMOs is calculated, and similarly thresholded. If the variance is below a threshold—currently set to 1.5 pixels—and the one second's worth of GMOs are also less than a threshold as described above, then the camera is deemed to be static. When a static state is detected, the current horizontal and vertical component of GMO(n) is set to zero, effectively disabling all stabilisation for that image.

The error corrected offsets from module 105 are deemed $GMO_{EC}$ 130 and $LMOs_{EC}$ 131.

Figure 8:
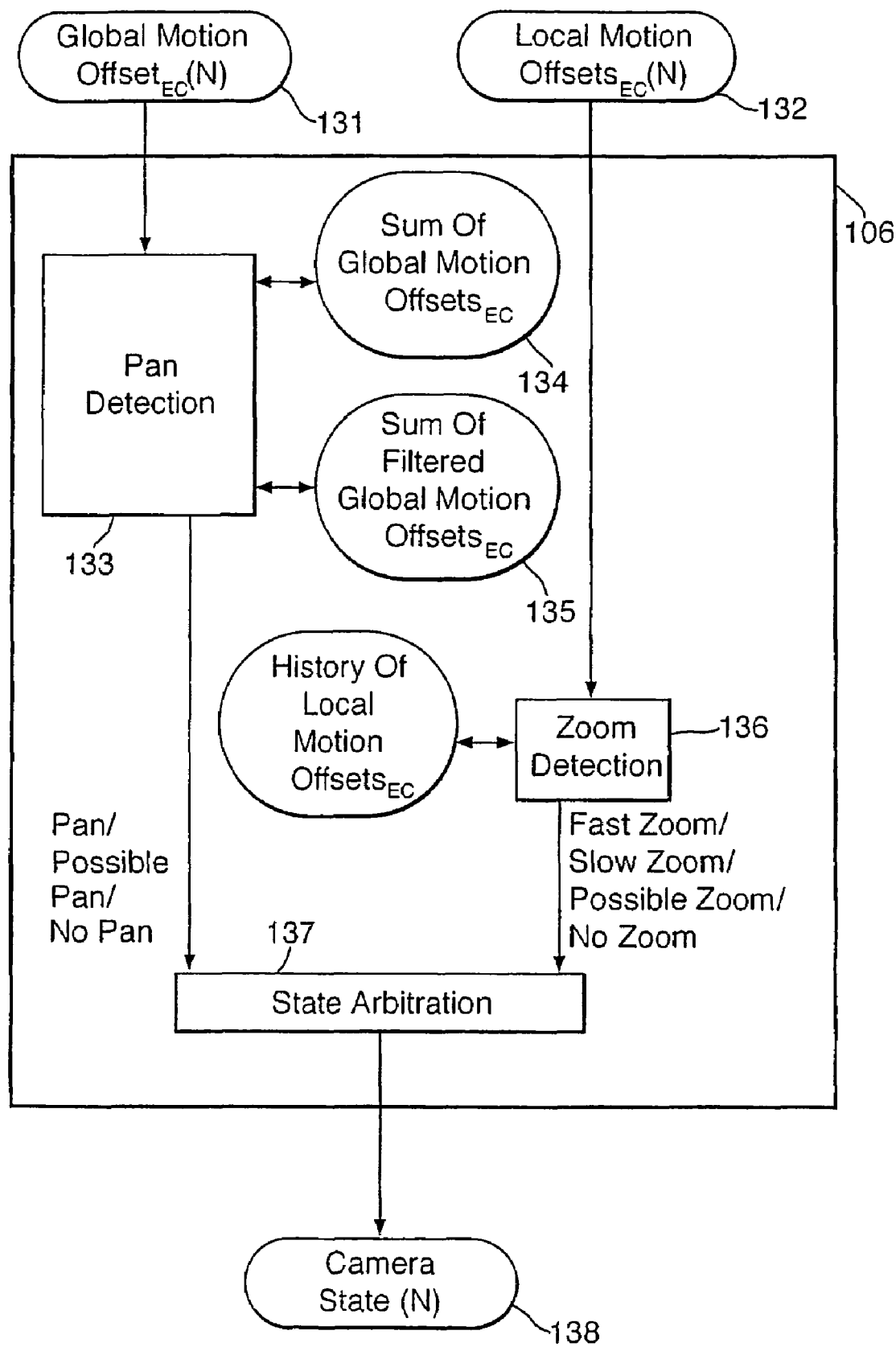
FIG. 8 shows in more detail the operation of camera pan and zoom detection.

FIG. 8 shows in more detail the operation of detecting the camera state 138—i.e. whether a pan or a zoom operation has taken place. In detecting a pan, the difference between two $GMO_{EC}$ sums is calculated 133. One is the sum 134 of the $GMOs_{EC}(n)$ from $GMO_{EC}(1)$ to $GMO_{EC}(n)$ (i.e. the accumulation of $GMO_{EC}$ values since the system was switched on). The other 135 uses the same offsets passed through a high-pass filter before summation. The filter used is a second-order Bessel filter with a cut-off frequency of 0.5 Hz, although a person skilled in the relevant arts will realise that there are many filter characteristics that will be suitable. More details of the calculation of this filter characteristic can be found in Rabiner, L. R., and B. Gold, "*Theory and Application of Digital Signal Processing*", Prentice Hall, 1975, pp228-230. A large enough difference between these sums indicates the presence of low-frequency global motion, typical of a pan. Note that the pan detection described above is similar to that which would be achieved by low-pass filtering the $GMO_{EC}$ sum; however, the above method is used as the high-pass filtered values are used in other processing, and so are already present in the system memory. The effort of calculating the low-pass filtered values is thus saved.

If the difference between the sums exceeds a threshold (set to 50.0 pixels in this embodiment), then a pan is deemed to have occurred. Until this threshold is exceeded, the pan detection shows a No Pan State. The first time the threshold is exceeded, the pan detection shows a Possible Pan State. If this happens for several consecutive images (set to 30 images in this embodiment) then there is enough evidence of a pan and the pan detection shows a Pan State.

Once the pan detection shows a Pan State, it will continue to show a Pan State until the difference between the sums does not exceed the threshold. To smooth the transition, the pan detection will show the Possible Pan State for a few images (set to 30 images in this embodiment) before returning to the No Pan State.

In detecting a zoom operation 136, the $LMOs_{EC}(n)$ 132 from a group of local motion blocks centred around the centre of the image are examined. Typically this is a rectangular border, one block deep around the edge of the grid of local motion blocks. This is illustrated in FIG. 9. Here, an image n, is shown, represented by the large rectangle 11. An inner portion 12, is shown divided up into a set of 6×8 local motion blocks, eg 13. A zoom-in is detected if $LMOs_{EC}$ from selected blocks appear to show movement generally towards the centre of the image. Likewise, a zoom-out is detected if the movement is generally away from the centre of the image. The selected blocks are those on the border (e.g. 14) of the inner portion 12 image n. The blocks on the left and right side of the rectangle are examined to see if they show motion greater than some threshold in the horizontal axis. Similarly, the blocks on the top and bottom of the rectangle are examined to see if they show motion greater than some threshold in the vertical axis. It will be seen therefore that corner blocks contribute to both the horizontal and vertical analysis.

For each block in the group, the magnitude of the motion offset is compared against a threshold value. If a block has a motion offset component magnitude greater than a given threshold then that block is considered to have significant motion.

For each block that has significant motion, the direction of the motion relative to the centre of the image is used to judge whether that motion shows a zoom-in or zoom-out. All blocks within the group are then examined to decide if a zoom operation is in progress. In the current embodiment, a zoom is deemed to have occurred if the following inequality is satisfied:

$$\text{Abs}(N_{Z(in)} - N_{Z(out)}) \geq \frac{1}{2} N_B \qquad (\text{Eqn 2})$$

where $N_{Z(in)}$ is the number of blocks in the group indicating a zoom in; and $N_{Z(out)}$ is the number of blocks in the group indicating a zoom out, and $N_B$ is the total number of blocks in the group. Of course, the direction of the zoom can be found by comparison of $N_{Z(in)}$ and $N_{Z(out)}$.

The inequality (Eqn 2) may in fact calculated twice, It is first calculated with values for $N_{Z(in)}$ and $N_{Z(out)}$ which include only those blocks where a motion offset component greater than 5 pixels occurs. If the inequality is then satisfied, then a "fast zoom" is deemed to be occurring. If the inequality is not satisfied then the calculation is repeated, this time including in $N_{Z(in)}$ and $N_{Z(out)}$ those blocks where a motion offset component of 1 or more pixels occurs. If the inequality is now satisfied then a "slow zoom" is deemed to be occurring. The reason for classifying a zoom as either a fast or slow zoom is because it has been found that better stabilisation is achieved by handling them differently. The difference in handling for the two states is given below.

If a zoom state is detected for more than a number of consecutive images (2 for a fast zoom and 10 for a slow zoom in the current embodiment) then there is enough evidence of a zoom and the zoom detection shows a zoom state.

Once the zoom detection shows a fast or slow zoom state, it will continue to show a zoom state until a zoom has not been detected for a number of consecutive images (10 in the current embodiment). To smooth the transition, the zoom detection will show the possible zoom state for a few images (again, 10 in the current embodiment) before returning to the no-zoom state.

If both a pan and a zoom are detected for a given image n, then a State Arbitration procedure 137 is used to decide which of these is the more important. The procedure works by assigning a priority to each of the stat7es, with the highest priority one being acted upon, and the others ignored. The order used in the current embodiment is shown in Table 1, in order of decreasing priority:

TABLE 1

1. Fast Zoom
2. Pan
3. Slow Zoom
4. Possible Pan
5. Possible Zoom
6. No Pan or Zoom detected.

Note that state 6 of Table 1 is selected by default if no other states are observed.

The camera state 138 as predicted by module 106 is fed into module 107 (see FIG. 2) where the stabilisation offset (SO) to be applied to image n is calculated. The other main input to module 107 is the error corrected $GMO_{EC}(n)$ 131. The detected camera state is used generate a final offset SO(n) 139 to be applied to the image n. This is done as indicated in Table 2.

TABLE 2

| Detected state | Final image stabilisation offset, SO(n) |
|---|---|
| 1 | SO(n) = rapid decay constant × SO(n − 1) |
| 2 | SO(n) = rapid decay constant × SO(n − 1) + HPF($GMO_{EC}$(n)) |
| 3 | SO(n) = decay constant × SO(n − 1) + HPF($GMO_{EC}$ (n)) |
| 4, 5 or 6 | SO(n) = decay constant × SO(n − 1) + ($GMO_{EC}$ (n)) |

The decay constants in Table 2 are used to decay the accumulated image offset over time. This slightly reduces the effect of stabilisation whilst improving the amount of image visible. If no camera motion is detected the decaying offset will eventually return the image to its initial starting position. It is particularly useful in the situation where camera shake ceases but the calculated offset does not return to zero.

Also, if an embodiment of the current invention is produced that does not have the capability to detect and correct for pan or zoom movements (which may be done to increase processing speed and image throughput for example), and the embodiment is inadvertently used with a panning or zooming camera, then it allows the system to work, albeit with slightly reduced fidelity during panning or zooming operations. The rapid decay constant currently used is 0.735, and the standard decay constant used is 0.98.

The high-pass filter (HPF) operation used in Table 2 is the same as that done in the pan detection, described above.

The offset SO(n) 139 as derived above is next applied, along with the camera state 138 to the image n to effect the stabilisation of the video signal. This is done in two stages, as indicated in FIG. 10. The first stage 140 shifts the image n according to the vector SO(n) 139. This shifting of the image may result in some borders of the image area not having any data, and hence being blank. The blank areas in successive images may be of different sizes, which would result in a flickering effect as the rapidly moving edges of the image sequence is presented to the output display device. The second stage of the display process therefore is to generate "dynamic" borders 141 that cover these blank areas The dynamic borders hide the rapidly moving edges of the stabilised image sequence. This is done by overlaying artificial black borders over the edges of the shifted image. These reduce the size of the visible image such that the rapidly moving edges are hidden. The borders continually adjust to show as much of the image as possible without showing the moving edges. The camera state, the stabilisation offset SO(n) and a history of the SO values are used to determine the amount of border shown. When a pan or zoom is occurring or there is little image motion, the dynamic borders decay to show the edges of the image. Typically the border will cover an area up to the maximum excursion of the images detected within an offset history period of 50 images.

The offset history used for the border generation gains an entry for each image according to the camera state:

If a Fast Zoom State, Pan State, Slow Zoom state, Possible Pan State or Possible Zoom State is detected, then the value in the offset history for image n is set to 0.

If a No Pan or Zoom State is detected, then the value in the offset history for image n is set to SO(n).

To prevent the borders changing too rapidly, the borders are limited in their rate of change for each image. The maximum change in the vertical direction is limited to 5 pixels per image and the maximum change in the horizontal direction is limited to 10 pixels per image. These values have been found to work well, but other values could be used.

The shifted image 142, with dynamic borders applied, is then converted to an analogue signal for replay on a monitor or recording to disk or tape. Of course, the digital signal could also be saved to a computer disk in any convenient format.

FIG. 11 shows the border generation inaction. In a) a scene is shown at which a video camera, mounted on an unstable platform, is pointed. Assume that the camera is wobbling up and down. The field of view of the camera is the non-hashed portion 143. The large rectangle represents the larger scene 144 as seen by the camera at any time during its movement over the scene 144, over a period of a few seconds. It will be seen that the camera is, for this image, pointing towards the top of the scene 144, hence the lower portion of the scene 145, represented by the hashed region, is not present.

Figure 11A:
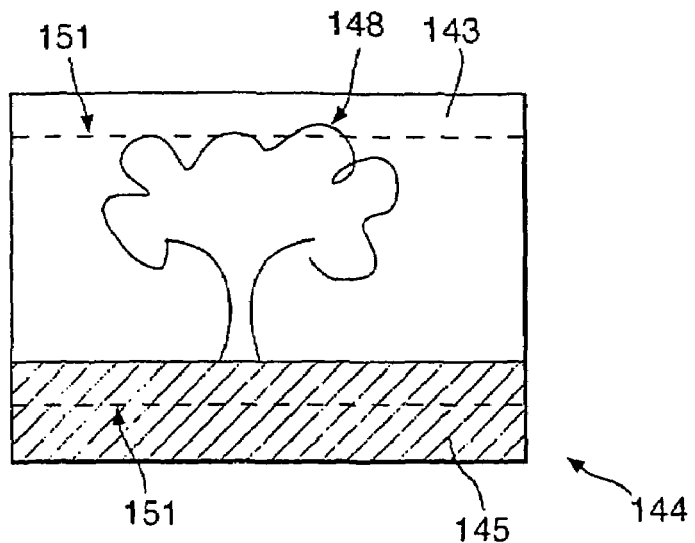

The image stabilisation system as disclosed herein, when presented with a sequence of images of which FIG. 11a was one, would tend to move the image 143 in towards the centre of the display area of the replay device, the upper and lower limit of which are here indicated by dotted lines 151. This would cause a gap at the top of the shifted frame. When the dynamic border is generated, the border at the top of the stabilised image is made at least as large as this movement, to hide this gap.

Figure 11B:
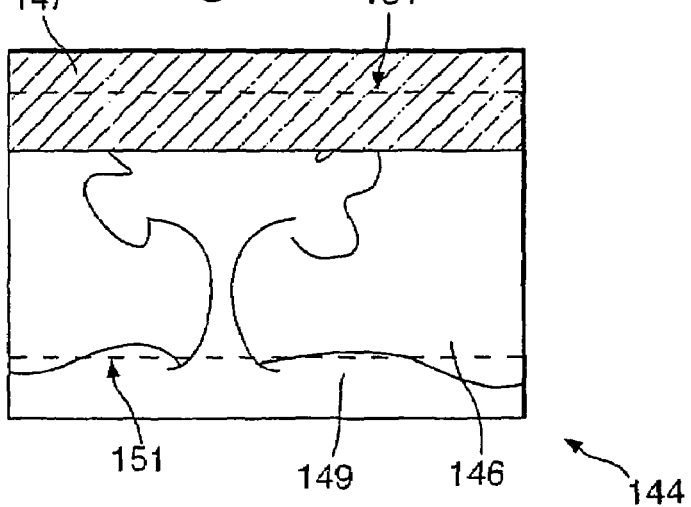

FIG. 11b) represents the image recorded by the camera a short time period later, when the camera has moved due to its wobble and is now pointing towards the bottom 146 of the larger scene 144. Because of this the top 147 of the larger scene 144 has not been recorded in this frame. Again, the stabilisation routine would tend to move this image into the centre of the display area as represented by dotted lines 151, and the gap produced by this would also be covered when generating the dynamic border.

As well as the above mechanism causing blank areas at the top and bottom of the stabilised image there are some areas of the larger scene 144 that are visible in one image but not in another. For example, in FIG. 11a the top of a tree 148 can be seen, whereas the ground cannot. Likewise, in FIG. 11b, the ground 149 can be seen, but the top of the tree cannot. If the borders just covered up the blank areas, then there would still be visible a flickering region adjacent these borders caused by the scene being only visible at certain times. These are the rapidly changing edges referred to above. To hide these, the border is extended to cover this region, the size of which is determined by examining the maximum excursion (given by the stabilisation offset) of the image seen over the previous fifty images.

Figure 11C:
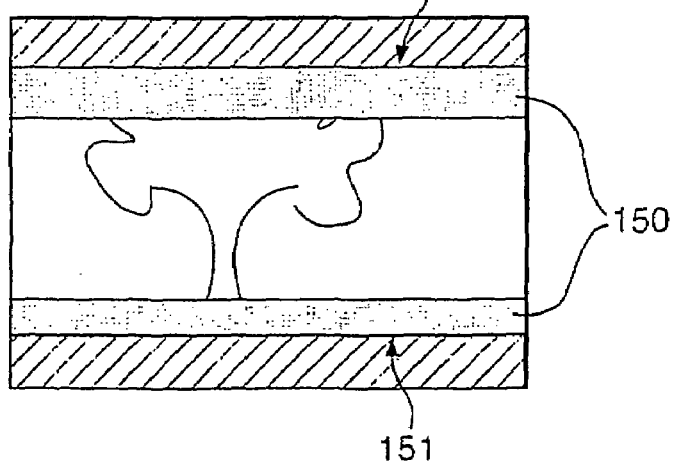

FIG. 11c shows the resultant stabilised image, with borders 150, within the display area indicated by numeral 151, generated as described above to cover the rapidly moving edges.

An alternative embodiment tackles the moving edge problem in a different manner. Here, where camera movement creates a blank area in an image, image information from a previous image is used to effectively overlay the blank area. This is done by creating a buffer image that comprises the current image as shifted by the offset as described above, that is written onto the previous image(s) in the buffer, such that it overwrites only those parts where image data is present in the current image, and leaves untouched those parts in the buffer that correspond to blank areas of the current image. In this way, the buffer image grows into an image that is larger than the display area given by the borders 151, but is a composite of the current image and previous images. The buffer image will be the size of the larger scene 144. The part of this buffer image fitting within the limits of the display as given by dotted lines 151 is then output to the display or recording device, and thus ensures that no dead areas or border space need be displayed.

A further embodiment expands the size of image to be displayed by linearly scaling it such that the image covers those parts that would otherwise be blank due to the image shifting process.

The skilled person will be aware that other embodiments within the scope of the invention may be envisaged, and thus the invention should not be limited to the embodiments as herein described.

The invention claimed is:

1. A video image stabilisation system for correction of camera motion, that is arranged to receive one or more signals representative of a plurality of images from an image source wherein, for an image n following at least an image (n−1) and an image (n−2) the system is arranged to estimate a Global Motion Offset (GMO) value between image n and a previous image representative of the spatial separation between the scene imaged in image n and the previous image, and apply a corrective movement to the image n based upon this GMO, characterised in that:

the system is arranged to estimate the GMO for the image n with reference to a mask that represents a region or regions of the image n not to be considered in the GMO estimation, the region(s) being region(s) estimated as likely to mislead the estimation of the GMO and wherein the system is arranged to examine one or more local regions of the image n and corresponding local regions of a previous image, and estimate a local motion offset (LMO) representative of spatial separation between like features in corresponding local regions of the current and previous images, and if the, or each, LMO is greater than a given threshold, to set area(s) of the mask that correspond to this local region or regions to indicate omission from the GMO estimation, wherein the LMO values of those parts of the image not masked are not used in the calculation of the GMO.

2. A stabilisation system as claimed in claim 1 wherein the local regions comprise an array of rectangular regions.

3. A stabilisation system as claimed in claim 1 wherein the system is arranged to estimate the GMO of an image representative of image n but having a spatial resolution lower than image n.

4. A stabilisation system as claimed in claim 3 wherein the system is arranged to iterate the estimation of the GMO on a plurality of images each representative of image n, where each of the plurality of images has a different spatial resolution.

5. A stabilisation system as claimed in claim 1 wherein the system is arranged to adjust the GMO if a stationary camera state is detected, this state being indicated by means of a plurality of contiguous GMOs including the current GMO all being below a given threshold.

6. A stabilisation system as claimed in claim 1 wherein the system is arranged to adjust the GMO if intentional adjustment of the image source viewing direction (pan) or field of view (zoom) is detected.

7. A stabilisation system as claimed in claim 6 wherein the system is arranged to detect a pan of the image source by means of low-pass filtering GMO values from at least a sequence of previous images at a cut-off frequency lower than that expected from unintentional camera movements.

8. A stabilisation system as claimed in claim 6 wherein a zoom is detected if a number x of LMOs examined for image n all show a direction of movement in towards a central region of the image n, or all show a direction of movement away from a central region of the image n, the number x being greater than some given threshold.

9. A stabilisation system as claimed in claim 8 wherein the threshold is 50% of those LMOs examined, and the number x is proportional to the absolute difference between the number of those LMOs examined showing a direction of movement in towards a central region of the image n, and those LMOs examined showing a direction of movement away from a central region of the image n.

10. A stabilisation system as claimed in claim 8 wherein the LMOs examined are taken from those local regions that are substantially adjacent the edge of image n.

11. A stabilisation system as claimed in claim 1 wherein the system is arranged to generate a border on at least one edge of the image n, the border being adjustable in size such that it covers any blank space between the edge of image n and the corresponding edge of a display area on which the image n is displayed.

12. A stabilisation system as claimed in claim 11 wherein the system is arranged to adjust the border size on at least one edge of the image n such that it also covers an area on image n corresponding to blank space present on one or more previous images.

13. A stabilisation system as claimed in claim 11 wherein the border generated by the system comprises of image data from one or more previous images.

14. A stabilisation system as claimed in claim 1 wherein the system is arranged to scale the image n, such that it covers any blank space between the edge of image n and the corresponding edge of a display area on which the image n is displayed.

15. A stabilisation system as claimed in claim 1 wherein anomalous pixels of the image n are used to set corresponding pixels of the mask such that they are excluded from the estimation of the GMO.

16. A stabilisation system as claimed in claim 15 wherein the pixels above a threshold in an image comprising the absolute difference between the image n and a previous image m, both images n and m having had corrective movements applied, are regarded as anomalous.

17. A stabilisation system as claimed in claim 1 wherein the system is arranged to multiply the calculated GMO, as adjusted in any other operation, by a decay constant factor lying between 0 and 1 before shifting the image n.

18. A method of stabilising a present image relative to at least one previous image where both current and previous images are part of a sequence of video images represented by an electronic signal, comprising the steps of:
  i. estimating a global motion offset (GMO) between the current and previous image representative of the spatial separation between the scene imaged in the current image and that imaged in the previous image; and
  ii. applying a corrective movement to the current image based upon the GMO; characterised in that:
  a mask image is used in estimating the GMO, the mask image representing a region or regions of the current image not to be considered in the GMO estimation, the region(s) being region(s) being estimated as likely to mislead the estimation of the GMO, and wherein the method further includes the step of examining one or more local regions of the current image and corresponding local regions of a previous image, and estimating a local motion offset (LMO representing the spatial separation between the features in corresponding local regions of the current and previous images, and if the, or each, LMO is greater than a given threshold, setting area(s) of the mask that correspond to this local region or regions to indicate omission from the GMO estimation, wherein the LMO values of those parts of the image not masked are not used in the calculation of the GMO.

19. A computer program designed to run on a computer, contained on a computer readable medium and arranged to implement a video image stabilisation system, the system being arranged to receive as an input a digital signal representative of a plurality of images from an image source wherein, for an image n following at least an image (n−1) and an image (n−2) the system is arranged to estimate a Global Motion Offset (GMO) value between image n and a previous image representative of the spatial separation between the scene imaged in image n and the previous image, and apply a corrective movement to the image n based upon this GMO, characterised in that:
  the system is arranged to estimate the GMO for the image n with reference to a mask that represents a region or regions of the image n not to be considered in the GMO estimation, the region(s) being region(s) estimated as likely to mislead the estimation of the GMO, and wherein the system is arranged to examine one or more local regions of the image n and corresponding local regions of a previous image, and estimate a local motion offset (LMO) representative of spatial separation between like features in corresponding local regions of the current and previous images, and if the, or each, LMO is greater than a given threshold, to set area(s) of the mask that correspond to this local region or regions to indicate omission from the GMO estimation, wherein the LMO values of those parts of the image not masked are not used in the calculation of the GMO.

20. A video image stabilization system for correction of camera motion, that is arranged to receive one or more signals representative of a plurality of images from an image source wherein, for an image n following at least an image (n−1) and an image (n−2) the system is arranged to estimate a Global Motion Offset (GMO) value between image n and a previous image representative of the spatial separation between the scene imaged in image n and the previous image, and apply a corrective movement to the image n based upon this GMO, characterised in that:
  the system is arranged to estimate the GMO for the image n with reference to a mask that represents a region or regions of the image n not to be considered in the GMO estimation, the region(s) being region(s) estimated likely to mislead the estimation of the GMO and further wherein the system is arranged to generate a border on at least one edge of the image n, the border being adjustable in size such that it covers any blank space between the edge of image n and the corresponding edge of a display area on which the image n is displayed, the border also being arranged to cover an area on image n corresponding to blank space present on one or more previous images.

* * * * *

UNITED STATES PATENT AND TRADEMARK OFFICE
CERTIFICATE OF CORRECTION

PATENT NO. : 7,609,293 B2 Page 1 of 1
APPLICATION NO. : 10/536952
DATED : October 27, 2009
INVENTOR(S) : Faulkner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Twelfth Day of October, 2010

David J. Kappos
*Director of the United States Patent and Trademark Office*